United States Patent [19]
Spencer et al.

[11] Patent Number: 5,332,030
[45] Date of Patent: Jul. 26, 1994

[54] MULTI-DIRECTIONAL COOLER

[75] Inventors: Alan L. Spencer, Cupertino; Ying-Yan Kuo, Palo Alto, both of Calif.

[73] Assignee: Space Systems/Loral, Inc., Palo Alto, Calif.

[21] Appl. No.: 903,895

[22] Filed: Jun. 25, 1992

[51] Int. Cl.$^5$ .................. F28D 15/02; B64G 1/50
[52] U.S. Cl. ........................... 165/32; 165/41; 165/904; 244/163
[58] Field of Search ........ 165/32, 41, 96, 904; 244/163

[56] References Cited

U.S. PATENT DOCUMENTS

| | | |
|---|---|---|
| 3,402,761 | 9/1968 | Swet . |
| 3,489,203 | 1/1970 | Fischell . |
| 3,749,156 | 7/1973 | Eby et al. ............... 165/32 |
| 4,133,376 | 1/1979 | Eilenberg et al. . |
| 4,162,701 | 7/1979 | Ollendorf ............... 165/32 |
| 4,388,964 | 6/1983 | Almgren et al. . |
| 4,420,035 | 12/1983 | Hewitt ................ 165/32 |
| 4,673,030 | 6/1987 | Basiulis ................ 165/32 |
| 4,757,688 | 7/1988 | Basiulis et al. . |
| 4,880,050 | 11/1989 | Nabamura et al. ......... 244/163 |

FOREIGN PATENT DOCUMENTS

| | | | |
|---|---|---|---|
| 2463058 | 3/1981 | France | ........... 244/163 |
| 59-1994 | 1/1984 | Japan . | |
| 189299 | 8/1991 | Japan | ........... 244/163 |

OTHER PUBLICATIONS

"A Variable-Conductance Heat Pipe Radiator for Marots-Type Communications Spacecraft" by Savage et al., Journal of Spacecraft, May-Jun. 1979, vol. 16, No. 3, pp. 176-180.

Primary Examiner—Albert W. Davis, Jr.
Attorney, Agent, or Firm—Perman & Green

[57] ABSTRACT

A passive thermal control system for use in a spacecraft or satellite. The system uses at least two heat pipe and radiator systems connected to a heat generating load of the spacecraft. The radiators are located at different sides of the spacecraft. The heat pipes can be prevented from transferring heat from the radiators to the heat generating load such that a first radiator can be exposed to heat from sunlight while the second radiator and heat pipe can still operate to remove heat from the heat generating load.

14 Claims, 1 Drawing Sheet

MULTI-DIRECTIONAL COOLER

BACKGROUND OF THE INVENTION

1. Field of the Invention

The present invention relates to heat transfer systems and, more particularly, to a thermal control system for a spacecraft or satellite.

2. Prior Art

Various heat transfer systems for use in spacecraft and satellites are known in the prior art. Some of these systems are disclosed in the following U.S. Pat. Nos.: 4,420,035; 4,162,701; 4,388,964; 3,489,203; 4,133,376; 3,402,761; 4,757,688; and 4,673,030. Japanese patent application No. 57-108,555 also discloses a thermal switch used with a heat pipe. "A Variable-Conductance Heat Pipe Radiator For MAROTS-Type Communication Spacecraft" by Savage et al., Journal of Spacecraft, May–June 1979, Vol. 16, No. 3, pp. 176-180, discloses a variable conductance heat pipe radiator.

It is an object of the present invention to provide a new and improved heat transfer system.

SUMMARY OF THE INVENTION

In accordance with one embodiment of the present invention, a passive thermal control system is provided comprising diode heat pipes, means for transferring heat from a heat load to the diode heat pipes, a first radiator, and a second radiator. The diode heat pipes comprise at least two pipes, each of the pipes having a reservoir area. The means for transferring heat from the heat load to the diode heat pipes comprises the reservoir areas being located proximate the heat load. The first radiator is connected to one of the diode heat pipes opposite its reservoir area. The second radiator is connected to another of the diode heat pipes opposite its reservoir area, the second radiator being orientated away from the first radiator.

In accordance with another embodiment of the present invention a passive thermal control system is provided comprising a first heat transfer system and a second heat transfer system. The first heat transfer system has means for automatically transferring heat from a load to a first radiator and means for automatically preventing predetermined excessive heat from the first radiator being transferred to the load. The second heat transfer system has means for automatically transferring heat from the load to a second radiator and means for preventing predetermined excessive heat from the second radiator being transferred to the load. The second radiator is orientated away from the first radiator. The first and second heat transfer systems each comprise a separate heat pipe.

In accordance with another embodiment of the present invention, a spacecraft heat dissipation apparatus is provided comprising a first heat transfer system and a second heat transfer system. The first heat transfer system has a first radiator, a diode heat pipe, and means for transferring heat from heat generating equipment in the spacecraft to the diode heat pipe. The first radiator is located at a first side of the spacecraft. The diode heat pipe is connected to the first radiator. The diode heat pipe has a reservoir located proximate the heat generating equipment. The second heat transfer system can transfer heat from the heat generating equipment to a second radiator, the second radiator being located at a second side of the spacecraft.

BRIEF DESCRIPTION OF THE DRAWINGS

The foregoing aspects and other features of the present invention are explained in the following description, taken in connection with accompanying drawings, wherein.

DETAILED DESCRIPTION OF THE INVENTION

Figure 1:
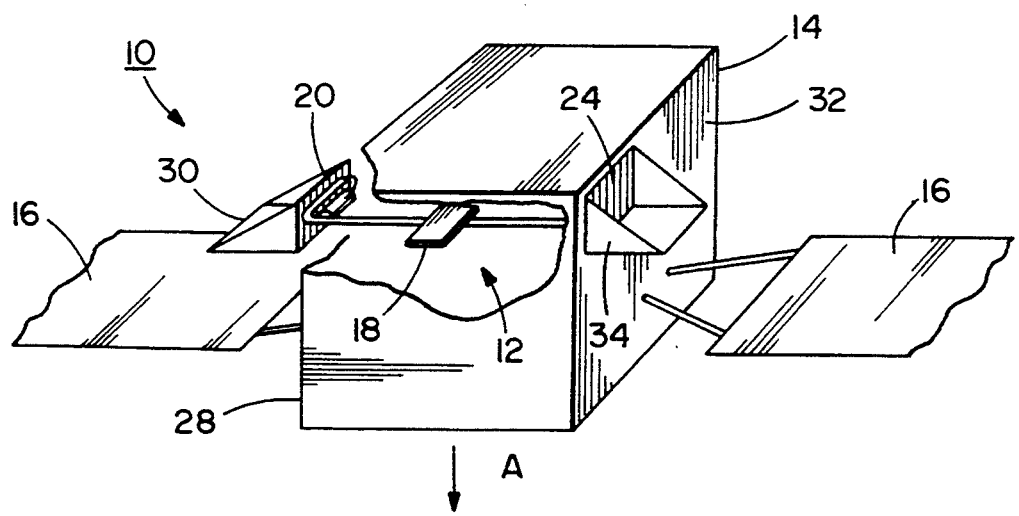
FIG. 1 is a schematic view of a space satellite with a cut-away section having a cooling system incorporating features of the present invention.

Referring to FIG. 1, there is shown a schematic view of a space satellite 10 with a cut-away section having a cooling system 12 incorporating features of the present invention. Although the present invention will be described with reference to a space satellite, the present invention can also be used in a spacecraft or any other apparatus where cooling is required. In addition, any suitable size, shape, number or type of elements or materials could be used as further understood from the description below.

The satellite 10 generally comprises a main unit 14 and solar panels 16 to power equipment in the main unit 14. The equipment inside the main unit 14 can be any suitable type of equipment. In the embodiment shown, the satellite 10 is a low earth orbit satellite, arrow A indicates the general direction of the Earth. However, the present invention could also be used in geosynchronous orbit satellites. The equipment inside the main unit 14, in the embodiment shown, includes a detector 18. The detector 18 is electrically powered and, thus, generates heat during operation. The detector 18 needs to be kept at a low temperature in order to function properly. Therefore, the cooling system 12 is provided in order to remove heat from the detector and transfer the removed heat from the satellite.

Figure 2:
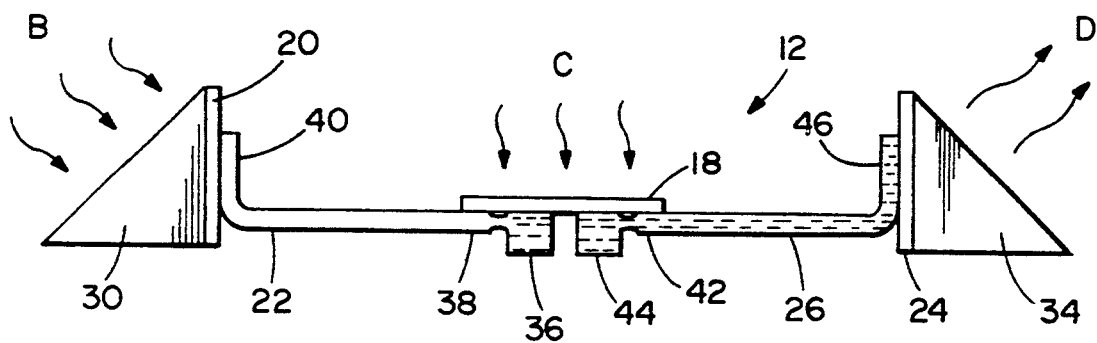
FIG. 2 is a schematic view of the cooling system used in the satellite shown in FIG. 1.

Referring also to FIG. 2, the cooling system 12 generally includes a first heat transfer system having a first radiator 20 and a first heat pipe 22, and a second heat transfer system with a second radiator 24 and a second heat pipe 26. The first radiator 20 is located at a first side 28 of the main unit 14. The main unit 14 includes a first reflector or shroud 30 to protect the first radiator 20 from heat from the solar panels 16. The second radiator 24 is located at a second side 32 of the main unit 14 about 180 degrees opposite the first radiator 20. In the embodiment shown, the first and second radiators 20 and 24 are substantially the same and are adapted to function as heat transfer members as further understood below. The second radiator 24 also has a second reflector or shroud 34 to protect the second radiator 24 from heat from the solar panels 16.

The first heat pipe 22, in the embodiment shown, is a diode heat pipe with a reservoir 36 at a first end 38, and a second end 40. The second end 40 is operably connected to the first radiator 20 such that heat can be transferred from the first pipe 22, to the first radiator 20, and into space. The first end 38 of the first heat pipe 22 is connected to the detector 18 such that heat can be transferred from the detector 18 to the first pipe 22. The first heat pipe 22 and first radiator 20 thus establishes the first heat transfer system to remove heat from the detector 18. The second heat pipe 26 and second radiator 24, in the embodiment shown, are substantially identical to the first heat pipe 22 and radiator 20 and establish the second heat transfer system.

The second heat pipe 26 has a first end 42 with a reservoir 44, and an opposite second end 46. The first end 42 is connected to the detector 18. The second end 46 is operably connected to the second radiator 24. Thus, the second heat pipe 26 and second radiator 24 can transfer heat from the detector 18 to space thereby cooling the detector 18. However, in an alternate embodiment, the two heat transfer systems need not be substantially identical. In addition, more than two heat transfer systems could be provided or the systems could cool more than one heat generating load.

One of the problems encountered with heat transfer system used in satellites and spacecrafts is that the systems can be influenced by solar heat. It is therefore an objective of the present invention to provide cooling of the detector 18 regardless of influence of solar heat on either one of the radiators 20 or 24. In order to accomplish this, the heat pipes 22 and 26 are provided as diode heat pipes with their reservoirs 36 and 44 located at the detector 18. In this type of configuration, in the event the second end 40 of the first heat pipe 22 becomes hotter than first end 38, the fluid in the first heat pipe 22 will condense into liquid form at the reservoir 36. However, when the first end 38 of the first heat pipe 22 is hotter than second end 40, the fluid in the first heat pipe 22 is located throughout the pipe between the first and second ends in the form of vapor and gas and thereby provides a heat conductance medium between the two ends 38 and 40. When the fluid is condensed in the reservoir 36, the fluid is substantially absent from the remainder of the first heat pipe 22 thereby substantially eliminating the heat conductance medium from the first heat pipe 22. Thus, when the second end 40 is hotter than the first end 38, the first heat pipe 22 substantially ceases to transfer heat. When the first radiator 20 is subjected to solar heat, as illustrated by arrows B in FIG. 2, the solar heat is automatically prevented from influencing the detector 18. However, the second radiator 24, being located on the opposite side of the main unit 14 and orientated about 180° away from the first radiator 20, is not subjected to solar heat at the same time as the first radiator 20. Therefore, the second heat pipe and second radiator 24 are still able to function to remove heat C from the detector 18 and radiate the heat into space as indicated by arrows D.

It should be noted that because the first and second heat systems are substantially identical, in the event that solar heat is received at the second radiator 24, the second heat transfer system will close down, similar to the way described above with the fluid in pipe 26 collecting in reservoir 44, but the first heat transfer system will be open thereby allowing heat C to be radiated into space at the first radiator. Hence, the present invention provides a simple passive dual-cooler system substantially unaffected by orientation of the satellite 10 relative to the sun.

Figure 3:
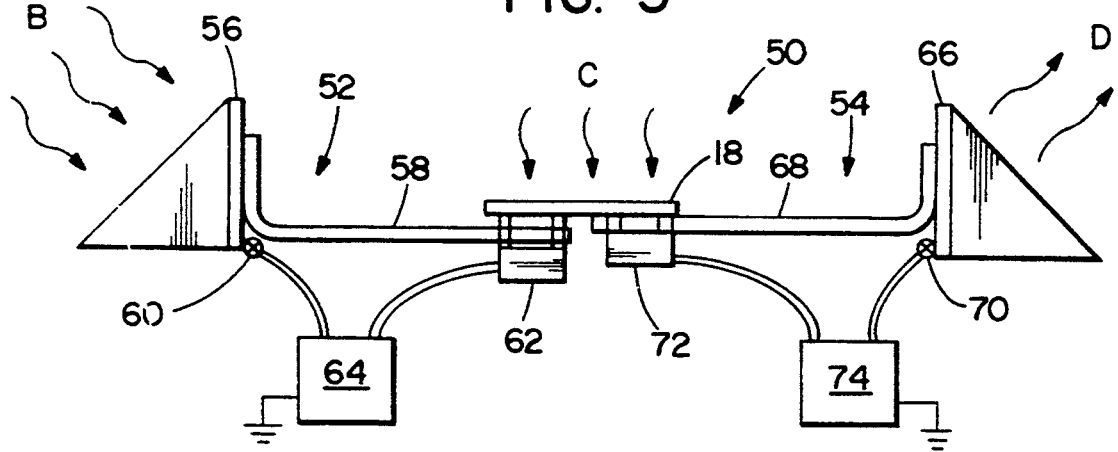
FIG. 3 is a schematic view of an alternate embodiment of the cooling system shown in FIG. 2.

Referring now to FIG. 3, there is shown an alternate embodiment of a dual-cooler system. In the embodiment shown, the system 50 includes a first heat transfer system 52 and a second heat transfer system 54. The first heat transfer system 52 includes a first radiator 56, a fixed conductance heat pipe 58, a first thermistor 60, a first solenoid 62, and first control electronics 64. The second heat transfer system 54 is substantially identical to the first heat transfer system. The second heat transfer system 54 includes a second radiator 66, a fixed conductance heat pipe 68, a second thermistor 70, a second solenoid 72, and second control electronics 74. The first thermistor 60 is sensed by control electronics 64. The control electronics 64 is connected to the solenoid 62 and is adapted to open and close it. The solenoid 62 is adapted to move the fixed conductance heat pipe 58 into thermal contact with the detector 18 when the solenoid 62 is closed and, adapted to move the fixed conductance heat pipe 58 out of thermal contact with the detector 18 when the solenoid 62 is open. Thus, the control electronics 64 senses the first thermistor 60 and opens the first solenoid 62 when the temperature at the first radiator exceeds a predetermined temperature. This opening of the first solenoid 62 eliminates thermal contact between detector 18 and pipe 58 thereby preventing heat from being transferred from the first radiator to the detector 18.

As noted above, the second heat transfer system 54 is substantially the same as the first heat transfer system 52. However, the second radiator 66 is located at a different side of the satellite than the first radiator 56. Thus, when the first radiator 56 is being subjected to solar heat, the second radiator 66 is not. The second electronics 74 senses the second thermistor 70. With the second thermistor 70 sensing a relatively cold condition, the electronics 74 keeps the second solenoid 72 closed which results in a good thermal contact between detector 18 and the second fixed conductance heat pipe 68. Thus, heat C from the detector 18 can be conducted by the second pipe 68 to the second radiator 66 and radiated into space as illustrated by arrows D. In the event that the second radiator 66 is subjected to direct solar heat and the first radiator 56 is not, the control electronics 64 and 74 will sense this condition by sensing thermistors 60 and 70 and automatically close the first solenoid 62 and open the second solenoid 72 to thereby allow heat C to be radiated into space at the first radiator 56 and close down the second heat transfer system 54 to prevent heat from being transferred from the second radiator 66 to the detector 18.

Let it be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A passive thermal control system comprising:
    at least two diode heat pipes, each of the pipes having a reservoir area;
    means for transferring heat from a heat load to the diode heat pipes comprising the reservoir areas being located proximate the heat load;
    a first radiator connected to one of the diode heat pipes opposite its reservoir area; and
    a second radiator connected to another of the diode heat pipes opposites its reservoir area, the second radiator being orientated away from the first radiator.

2. A system as in claim 1 wherein the first and second radiators are orientated about 180° offset from each other.

3. A system as in claim 1 wherein the diode heat pipes are adapted to substantially prevent transfer of heat from the radiators if their temperature exceeds a predetermined temperature.

4. A system as in claim 3 wherein the predetermined temperature is about 180° K.

5. A system as in claim 1 wherein at least one of the radiators has a reflector/shroud at its exterior.

6. A passive thermal control system comprising:
a first heat transfer system having means for automatically transferring heat from a load to a first radiator, and means for automatically preventing predetermined excessive heat from the first radiator being transferred to the load; and
a second heat transfer system having means for automatically transferring heat from the load to a second radiator, and means for preventing predetermined excessive heat from the second radiator being transferred to the load, the second radiator being orientated away from the first radiator, the first and second heat transfer systems each comprising a separate heat pipe wherein at least one of the heat pipes is a diode heat pipe.

7. A system as in claim 6 wherein the means for automatically preventing in the first heat transfer system includes its heat pipe having a reservoir located proximate the load.

8. A system as in claim 6 wherein the means for automatically preventing in the first heat transfer system includes an electro-mechanical switch connected to its heat pipe adapted to block heat transfer from the first radiator to the load.

9. A system as in claim 6 wherein the means for automatically preventing in the first heat transfer system includes a thermal switch adapted to block heat transfer from the first radiator to the load.

10. A system as in claim 6 wherein the first and second radiators are orientated about 180° relative to each other.

11. A spacecraft heat dissipation apparatus comprising:
a first heat transfer system having:
  (a) a first radiator located at a first side of the spacecraft;
  (b) a diode heat pipe connected to the first radiator;
  (c) means for transferring heat from heat generating equipment in the spacecraft to the diode heat pipe, the diode heat pipe having a reservoir located proximate the heat generating equipment; and
a second heat transfer system for transferring heat from the heat generating equipment to a second radiator, the second radiator being located at a second side of the spacecraft.

12. An apparatus as in claim 11 wherein the second radiator is orientated about 180° relative to the first radiator.

13. An apparatus as in claim 11 wherein the diode heat pipe is adapted to prevent heat being transferred from the first radiator to the equipment if the temperature of the first radiator exceeds about 180° K.

14. An apparatus as in claim 11 wherein the second heat transfer system includes a diode heat pipe with a reservoir located proximate the heat generating equipment.

* * * * *